(12) United States Patent
Harju

(10) Patent No.: US 7,786,634 B2
(45) Date of Patent: Aug. 31, 2010

(54) MOTOR- OR A GENERATOR-RELATED ARRANGEMENT

(75) Inventor: Bert Ivan Harju, Harads (SE)

(73) Assignee: Gas Power Energy AB (SE)

( * ) Notice: Subject to any disclaimer, the term of this patent is extended or adjusted under 35 U.S.C. 154(b) by 82 days.

(21) Appl. No.: 11/658,627

(22) PCT Filed: Oct. 27, 2004

(86) PCT No.: PCT/SE2004/001555

§ 371 (c)(1),
(2), (4) Date: Jul. 23, 2007

(87) PCT Pub. No.: WO2006/011833

PCT Pub. Date: Feb. 2, 2006

(65) Prior Publication Data

US 2008/0136276 A1  Jun. 12, 2008

(30) Foreign Application Priority Data

Jul. 27, 2004  (SE) ................................. 0401940

(51) Int. Cl.
*H02K 7/06* (2006.01)
(52) U.S. Cl. ...................................................... 310/83
(58) Field of Classification Search .................. 310/83, 310/112, 113, 114, 115
See application file for complete search history.

(56) References Cited

U.S. PATENT DOCUMENTS

| | | | |
|---|---|---|---|
| 4,056,746 A * | 11/1977 | Burtis | 310/115 |
| 4,291,233 A | 9/1981 | Kirschbaum | |
| 5,089,734 A | 2/1992 | Bickraj | |
| 5,262,693 A | 11/1993 | Holka | |
| 5,844,345 A | 12/1998 | Hsu | |
| 6,707,224 B1 * | 3/2004 | Petersen | 310/254.1 |
| 6,917,134 B2 * | 7/2005 | Hirama et al. | 310/216.008 |

FOREIGN PATENT DOCUMENTS

| DE | 102 48 933 C1 | 10/2002 |
|---|---|---|
| EP | 1 411 246 A2 | 6/2003 |

* cited by examiner

*Primary Examiner*—Nguyen N Hanh
(74) *Attorney, Agent, or Firm*—Seyfarth Shaw LLP; Joseph P. Quinn; Jospeh R. Lanser (57) ABSTRACT

The disclosure relates to a motor- or generator-related arrangement or structure (20) with two parts (5, 15) rotatably disposed in relation to one another, where a first part (5), serving as rotor unit, is rotatably disposed about a shaft (7) in a first selected direction of rotation, and a second part (15), serving as stator unit, is rotatably disposed about said shaft (7) in a second selected direction of rotation counter directed to said first selected direction of rotation. Means (2, 3, 4, 14 and 13) are arranged for transforming the speed of the first direction of rotation to the second direction of rotation. Said means includes a first gear rim or ring (14), associated with the stator unit (15), at least two gear rotary wheels (4, 4'), coordinated with a housing (1, 11), and a second gear rim or ring (3) associated with the rotor (5).

19 Claims, 6 Drawing Sheets

MOTOR- OR A GENERATOR-RELATED ARRANGEMENT

This application is a U.S. National Phase of International Patent Application Serial No. PCT/SE2004/001555, filed Oct. 27, 2004 which claims priority to Swedish Patent Application No. 0401940-2 filed Jul. 27, 2004.

TECHNICAL FIELD

The present invention relates in general to a motor- or a generator-related arrangement or structure and in particular to such motor- or generator-related arrangements including two structure parts, which each are rotatably disposed in relation to one another within a housing or a support 1.

Hence, a motor- or generator-related arrangement, in accordance with the present invention, may be utilised either as a motor, if electric energy is fed to coils associated with the motor and thereby utilise a torque active on a shaft, but the arrangement or structure may, as an alternative, also be utilised as a generator, in the event the rotary movement of the shaft is caused by an external prime mover and thereby coils associated with the generator will generate an electric voltage.

It will be obvious to a person skilled in this technical field and familiar with this art that a motor structure of the contemplated type may be utilised as a generator for generating electric energy and electric power and vice versa and making required amendments to the construction.

Against this background, the following description will, solely for purposes of simplification, describe and clarify a generator-related arrangement or structure of significance for the present invention.

A first of these two part structures consists of a part structure serving as a rotor, which is rotatably disposed about an associated shaft and in a first selected direction of rotation, and a second of these part structures consists of a part serving as a "stator", rotatably disposed about said shaft associated with the rotor in a second selected direction of rotation, where the second selected direction of rotation is chosen to be counter directed in relation to said first selected direction of rotation.

A generator-related arrangement or structure of the contemplated type also displays means, causing a transforming of the rotational direction and speed from said first direction of rotation to said second direction of rotation.

The present invention is based on the feature that said rotating and/or speed transforming means should be adapted, on the basis of said first selected direction of rotation and a selected speed, to transform this rotation or speed to a corresponding and equal speed for the second direction of rotation.

In the following description and claims we have used the wording "stator" for a second of these two structures, however, it will be apparent that this "stator" is caused to rotate.

BACKGROUND OF THE INVENTION

Methods and arrangements of the above-outlined nature are previously known in the art in a plurality of different embodiments.

As a first example of the state of the art, reference is made to the contents of United States patent, allotted the Serial Number U.S. Pat. No. 5,089,734, which discloses and describes, also with reference to FIG. 1 in the present application, a generator-related arrangement or structure which includes a construction where a rotary stator structure supports two opposing permanent magnets for generating an interposed magnetic field and where a rotor, or armature, is adapted to support corresponding electric coils and a speed transforming means, in the form of a gear arrangement in order thereby to create a rotation of the stator structure, which is coordinated with and simultaneous with the rotor structure and the magnetic field generating permanent magnets in a direction opposite to the direction of rotation imparted to the coils of the rotor structure.

In said patent specification, as at column 2, lines 40 to 47, there is disclosed a pre-condition also relevant for the present invention, namely that the stator structure is to rotate at the same angular velocity as the rotor structure and thereby the coils supported by the rotor structure will cut through the magnetic field at an effective angular velocity which is twice as great as that angular velocity at which they actually rotate related to a support.

Thus, for a given angular velocity for the coils, the generator-related arrangement or structure will theoretically be capable of producing double the electromotive force, which a generator structure can offer which has a stator structure and a stationary magnetic field.

A structure with a rotary stator arranged in this manner may thus be driven at half of the angular velocity for the shaft than a structure with a stationary stator.

The generator-related arrangement or structure disclosed here displays specially designed means, adapted to transforming the speed related to the first direction of rotation to speed related to the second direction of rotation in the form of a complicated gear arrangement, where a plurality of gear wheels are in mechanical mesh and contact with additional gear wheels and where the design of such means may be expected to create a play or mis-alignment, which will harmfully affect the phase relationship between voltages generated by the generator.

In addition, this structure shows that the pivotal mass is substantially concentrated to the rotary stator and, as a result, gives no indication of allowing a concentrated pivotal mass to be coordinated and related to the rotor.

The contents of United States Patent Specification U.S. Pat. No. 4,291,233 also belong to the state of the art and disclose and describe a wind-powered turbine generator system, this system being adapted to transform a rotation related energy for a wind-powered turbine into a rotation direction in an opposing direction for a rotor and a stator included in a dynamoelectric machine in order thereby to be able to generate electric power or voltage.

CONSIDERATION OF THE PRESENT INVENTION

Technical Problems

Considering the circumstance that the technical deliberations that must be made by a person skilled in the art to be able to offer a solution to one or more technical problems posed is, on the one hand, initially a necessary insight into the measures and/or sequence of measures to be adopted and, on the other hand, a necessary selection of the means required, the following technical problems are likely, in view hereof, to be relevant in the evolution of the structure according to the present invention.

Considering the state of the art, as described above, it should therefore be seen as a technical problem to be able to realise the importance of, the advantages associated with and/or the technical measures and considerations which will be required in order, in a motor- or generator-related arrangement or structure of the nature disclosed by way of introduction, to disclose simple measures to create a compact mechanical unit, where a rotor unit and a stator unit are both rotatably enclosed within a fixed housing or support and utilising this housing or support as a bearing device or means, not only for said shaft associated with the rotor unit but also for a selected number, such as a plurality, of, for a counter-directed rotating adapted, gear rotary wheels.

"Gear rotary wheels" are used to indicate rotary wheels adapted to mesh with gear rims or rings, in order to cause a counter-directed rotating sequence of one gear rim in relation to an adjacent oriented gear rim.

There is further a technical problem in being able to realise the importance of, the advantages associated with and/or the technical measures and considerations required in order, within a compact arrangement or structure, to create the preconditions so that coils, associated with a generator or a motor, can be coordinated in order to be capable of generating or being driven by a three-phase alternating current or a DC-current (a Direct Current), via the common use of known rectifying means and/or circuits.

There is a technical problem in being able to realise the importance of, the advantages associated with and/or the technical measures and considerations required to cause the rotor to display and contain a number of magnets, disposed in a selected direction of rotation and at a selected peripheral velocity to pass with their magnetic fields rotating coils associated with said stator.

There is a technical problem in being able to realise the importance of, the advantages associated with and/or the technical measures and considerations, which derive from causing said magnets to be selected as coordinated permanent magnets, especially with a high magnetic flux.

There is a technical problem in being able to realise the importance of, the advantages associated with and/or the technical measures and considerations which can create such preconditions that said magnets may be selected as DC-magnetised magnets, using a previously known required commutator.

There is a technical problem in being able to realise the importance of, the advantages associated with and/or the technical measures and considerations which derive from not only adapting the speed of the rotor unit and the generator shaft to be equal to and counter-directed in relation to the speed of the stator unit but also adapting them mutually in number and positions so that they will be adapted to generate voltage pulses at a selected frequency, this frequency normally being chosen to a network adapted frequency, such as 50 Hz or 60 Hz.

There is a technical problem in being able to realise the importance of, the advantages associated with and/or the technical measures and considerations which derive from causing a bracket or the similar construction to be adapted and intended for the stator unit and a bracket or the similar construction to be adapted and intended for the rotor unit, both to consist of a material with a manifestly low degree of magnetic conductivity.

There is a technical problem in being able to realise the importance of, the advantages associated with and/or the technical measures and considerations which derive from causing a bracket or the like, associated with the rotor unit and connected to the shaft, to be adapted to support a gear rim or gear ring, associated with the rotor unit, oriented on or with a diameter exceeding a selected diameter related to and adapted for the rotor unit construction itself.

There is a technical problem in being able to realise the importance of, the advantages associated with and/or the technical measures and considerations which derive from causing a bracket or the like, connected to the stator unit, to be adapted to support a gear rim or gear ring associated with the stator unit, oriented on or with a diameter exceeding a selected diameter related to and adapted for the rotor unit and an equally selected diameter for the stator unit.

There is a technical problem in being able to realise the importance of, the advantages associated with and/or the technical measures and considerations which derive from causing the utilised gear rims or rings associated with the rotor unit and the utilised gear rims or rings associated with the stator unit to be identical and disposed as "mirror reflections".

There is a technical problem in being able to realise the importance of, the advantages associated with and/or the technical measures and considerations which derive from causing, between two gear rims or rings coordinated in pairs as mirror reflections, to disclose the utilisation of a plurality, preferably in any event two, gear rotary wheels, coordinated with the gears or teeth of the two gear rims or rings and rotatably secured and/or journalled secured to said housing or support, adapted to surrounding the rotor, stator and associated brackets or the like.

There is a technical problem in being able to realise the importance of, the advantages associated with and/or the technical measures and considerations which derive from causing the axis of rotation for each one of said gear rotary wheels to be oriented at right angles to an allocated orientation of an axis of rotation for the rotor unit and distributed with a pre-selected angle, such as a 120° or 90° spacing from one another.

There is a technical problem in being able to realise the importance of, the advantages associated with and/or the technical measures and considerations which derive from creating such preconditions for the means or gear rotary wheels transforming the first direction of rotation to said second direction of rotation so that it may display only few gear meshes or mechanical engagements for the transformation of the direction of rotation and where any possible mechanical wear will only insignificantly or not at all affect phase differences between generated voltages and voltage pulses.

There is a technical problem in being able to realise the importance of, the advantages associated with and/or the technical measures and considerations which derive from being able to create such preconditions that a selected concentrated pivotal mass will be related towards the middle or centre at idle running.

There is a technical problem in being able to realise the importance of, the advantages associated with and/or the technical measures and considerations which derive from being able to create such preconditions that the mechanical forces active between two toothed gear rims or gear rings and the intermediate gear rotary wheels are compensated for by forming said gear rims sloping and said gear rotary wheels conical.

There is a technical problem in being able to realise the importance of, the advantages associated with and/or the technical measures and considerations, which derive from being able to create such preconditions that the voltage and current values can be regulated in a special way.

Solution

The present invention thus takes as a point of departure or stand point a motor- or generator-related arrangement or structure with two mechanical parts disposed rotatably in relation to one another where a first part is serving as a rotor and is rotary arranged about a shaft in a first selected direction of rotation, and a second part is serving as a "stator" and is rotatably disposed about a shaft in a second, selected direction of rotation, which is counter-directed in relation to said first selected direction of rotation.

The structure is based on the utilisation of means transforming the speed of the first direction of rotation to the second direction of rotation and where such means is particularly adapted, on the basis of said first selected direction of rotation and a selected speed, to transform this speed to a corresponding speed for the second direction of rotation.

In order to be able to solve one or more of the above-outlined technical problems, the present invention proposes that said speed transforming means, include a first gear rim or ring allocated to the rotor and a second gear rim or ring allocated to the stator, at least one, preferably two, three or four "gear rotary wheels" coordinated with a housing or a support where a rotation allocated to the gear rim or ring associated with the rotor over said gear rotary wheels creates or causes a counter-directed rotation for the gear rim or ring associated with the stator.

As proposed embodiments, which fall within the scope of the inventive concept of the present invention, it is suggested that electrical coils associated with the rotor or stator are coordinated so as to be capable of generating a three-phase alternating current or a direct current (DC) via rectifier means.

It is further disclosed that the rotor be capable of displaying a number of magnets, which are disposed, on rotation, to pass rotating coils associated with the stator.

In this regard, the present invention discloses that said magnets may, on the one hand, be selected as permanent magnets, but may also be selected as DC current-magnetised magnets.

Further, the present invention discloses that the speed of the rotor and the speed of the stator be mutually adapted to be equal in order thereby to be capable of generating voltage pulses with a selected frequency, such as 50 Hz or 60 Hz.

It is further disclosed that a bracket or the like, intended for the rotor, and a bracket or the like, intended for the stator consist of a material of low magnetic conductivity.

More specifically, it is disclosed, according to the present invention, that a bracket connected to the shaft be adapted to support a gear rim or ring associated with the rotor, oriented with associated teeth on a diameter exceeding a selected diameter of the rotor.

It is further disclosed that a bracket connected to the stator be adapted to support a gear rim or ring associated with the stator, oriented with associated teeth on a diameter exceeding a selected diameter for the rotor and a selected diameter for the stator.

Between the pairwise coordinated gear rims or rings there are disposed in any event two toothed gear rotary wheels, rotatably secured to a housing or support surrounding the rotor, stator and associated brackets or the like.

The rotation axes for each one of said gear rotary wheels are oriented at right angles to an allocated axis of rotation of the rotor.

It is also suggested that said gear rotary wheels are formed as frustum of a cone.

Advantages

The advantages which may principally be considered as significant for a motor- or generator-related arrangement or structure displaying the significative characterising features associated with the present invention are a manifestly compact structure in that there have hereby been created the preconditions for a rotatably disposed rotor unit and a counter rotatably disposed stator unit to be coordinated so as to be capable of being enclosed in a small housing or support.

The present invention further offers the utilisation of a rotor unit based on permanent magnets or DC current magnetised magnets and where measures have been implemented to render the magnetic flux within the generator more effective.

The utilisation of rotary gear wheels between mirror-reversed gear rims or rings and the fact that these are to be coordinated with the housing or support also contribute in the housing or support being capable of displaying limited circumference.

That which may principally be considered as characterising the present invention is disclosed in the characterising clause of appended claim 1.

BRIEF DESCRIPTION OF THE
ACCOMPANYING DRAWINGS

A prior art generator-related arrangement or structure adapted to function principally as the function related to the present invention, as well as a number of motor- or generator-related arrangements or structures, constructed in accordance with the advice linked to the present invention, will now be described in greater detail hereinbelow, with reference to the accompanying drawings. In the accompanying drawings.

Figure 1:
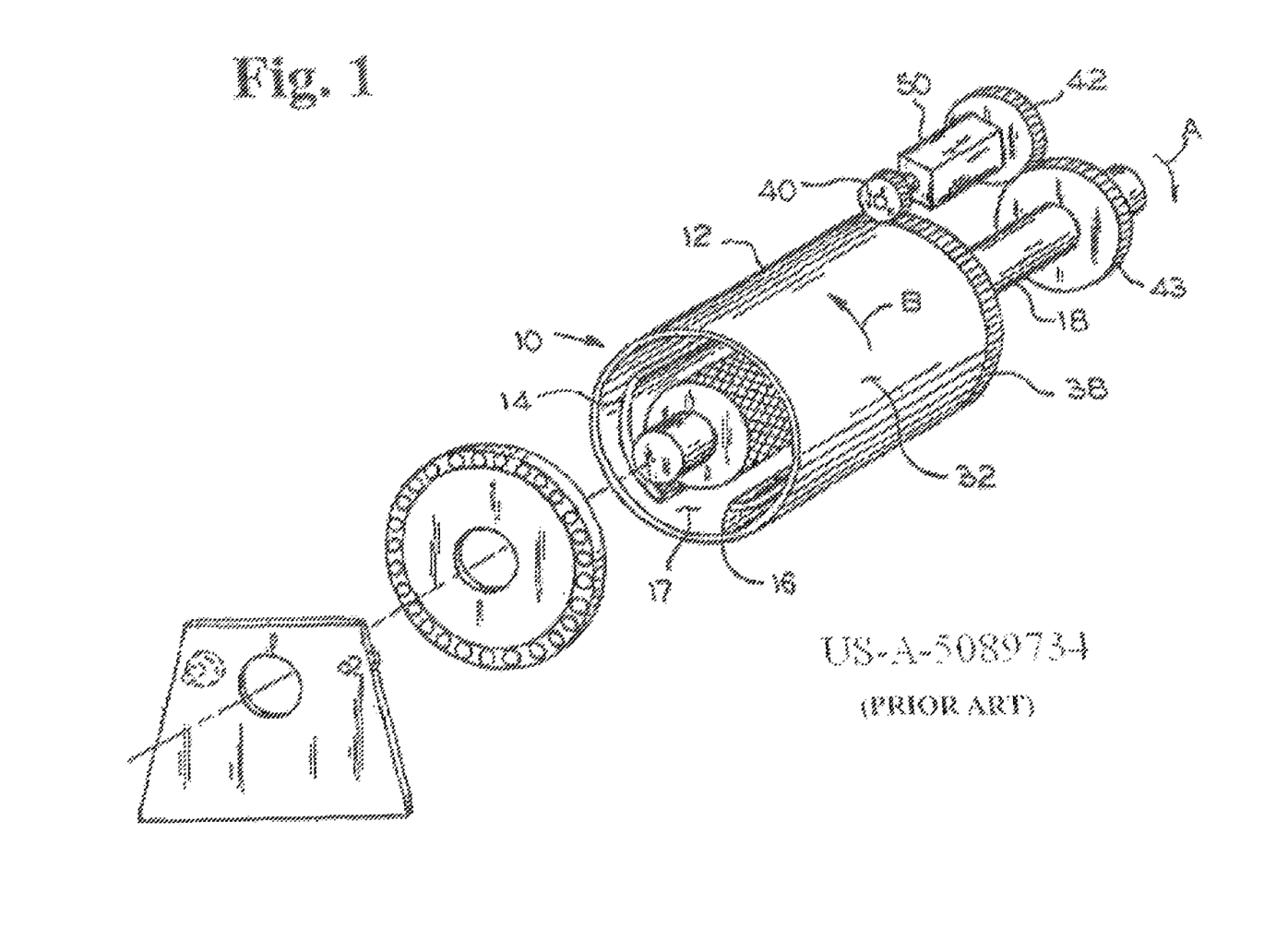
FIG. 1 is a perspective presentation of a generator-related arrangement or structure in accordance with that is disclosed in the US Patent Specification U.S. Pat. No. 5,089,735.

DESCRIPTION OF THE PRIOR ART IN
ACCORDANCE WITH FIG. 1

With reference to FIG. 1, there is here shown a perspective presentation of a generator-related arrangement or structure with two parts rotatably disposed in relation to one another, where a first part, serving as rotor unit, is rotatably disposed about a shaft in a first, selected direction of rotation and a second part, serving as stator unit, is rotatably disposed about said shaft in a second, selected direction of rotation, counter directed in relation to said first selected direction of rotation.

It is further disclosed means, transforming the speed of the first direction of rotation to the second direction of rotation where such means is adapted, on the basis of said first, selected direction of rotation and a selected speed, to transform this speed to a corresponding speed for the second direction of rotation.

More specifically, FIG. 1 shows a generator arrangement 10 which includes a hollow cylindrical housing 12 in the form of a stator unit displaying magnetically generating means in the form of permanent magnets of which two, designated 14 and 16, are shown mounted to the inner surface 17 of the housing or the stator unit.

A rotor unit 18 displays a plurality of electrical coils, which are disposed to rotate coaxially with the housing or the stator unit 12 with the aid of previously known means, provided with a number of gear wheels coordinated into said arrangement.

In particular, it is disclosed here that the housing or the stator unit 12 and the two permanent magnets 14 and 16 are to rotate simultaneously with and in a direction counter directed to the direction of rotation of the rotor unit 18.

In FIG. 1 is shown that the speed transforming means, intended on the basis of a selected direction of rotation "A" for the rotor unit, to cause the stator unit 12 to rotate in a second, counter-directed direction of rotation "B", includes a gear rim or ring 38 mounted to the outer surface 32 of the stator unit 12 which cooperates with a gear wheel 40, which is driveable connected to a further gear wheel 42 and which is driven with the aid of a still further gear wheel 43 mounted to the rotor 18 and its shaft.

DESCRIPTION OF CURRENTLY PROPOSED EMBODIMENT

It should be emphasized by way of introduction that, in the following description of currently proposed embodiments which display the significative characterising features related to the present invention and which is clarified by means of the figures shown in the accompanying drawings, we have selected terms and special terminology with the intention principally of clarifying the inventive concept.

However, in this context it should be observed that the expressions selected here should not be considered as restrictive exclusively to the terms selected and utilised here but it should be understood that each thus selected term is to be interpreted so that, in addition, it encompasses all technical equivalents which function in the same or substantially the same manner in order thereby to be able to attain the same or substantially the same intention and/or technical effect.

Figure 2:
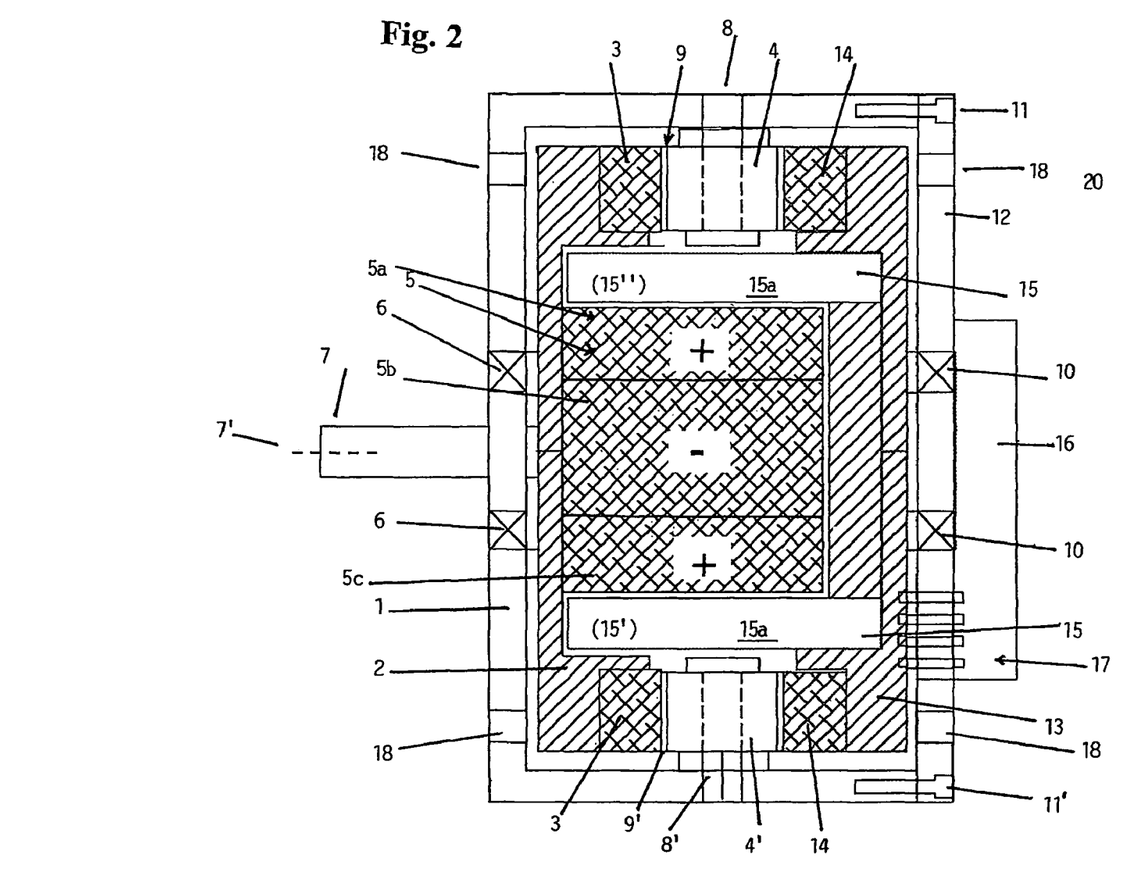
FIG. 2 shows, in a side elevation and in a section, a first embodiment of a motor- or generator-related arrangement or structure according to the present invention and where this embodiment is based on the feature to utilise magnets associated with the rotor and these magnets are selected as permanent magnets.

With reference to FIG. 2 there is here illustrated a motor- or generator-related arrangement or structure, designated 20, of the nature disclosed by way of introduction and where this structure 20 comprises a shaft 7 fixed to a rotor unit 5, a stator unit 15 and an outer housing 1, 12 and where the rotor unit 5 and the stator unit 15 are disposed to rotate in opposite directions and at the same angular velocity in relation to a support, illustrated as said housing 1, 12.

Figure 3:
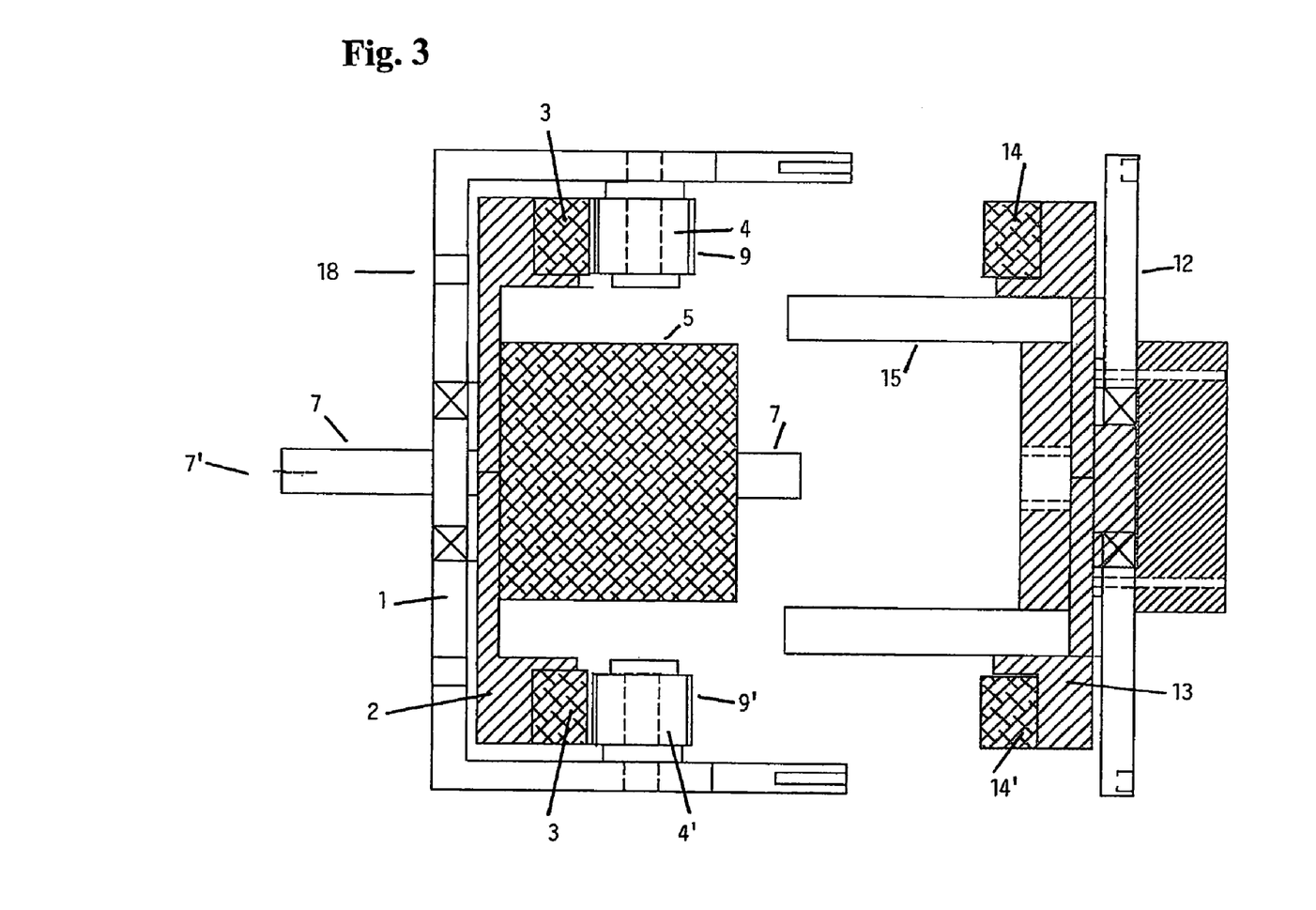
FIG. 3 is an exploded view of the motor or generator-related arrangement or structure according to FIG. 2 in order thereby to be able to distinguish the different parts of the rotor unit from the different parts of the rotary stator unit.
Figure 4:
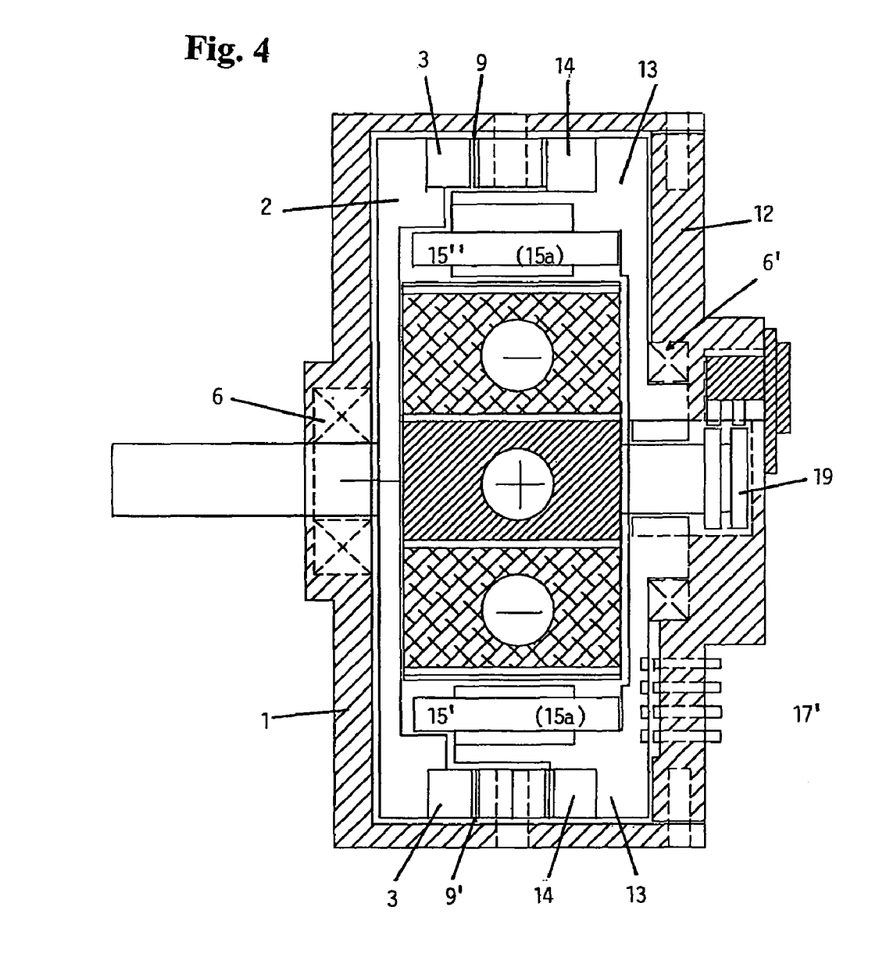
FIG. 4 shows, in a side elevation and in a section, a second embodiment of a motor- or generator-related arrangement or structure according to the present invention and where said magnets, associated with the rotor unit, are selected to be DC current magnetised magnets with a connected voltage regulator.
Figure 5:
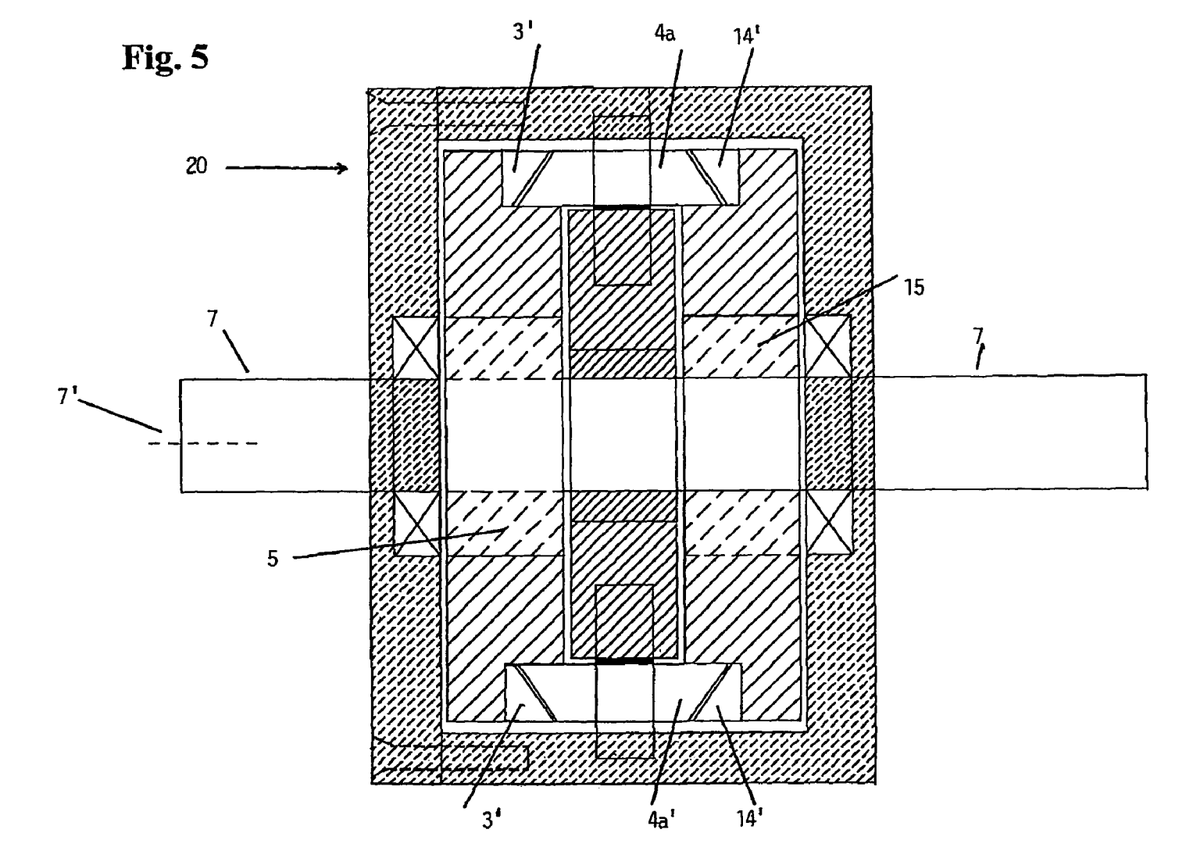
FIG. 5 shows, in a side elevation and in a section, a third embodiment of a motor- or generator-related arrangement or structure where a stator unit related gear rim or rings and a rotor unit related gear rim or ring are interrelated by a number of gear rotary wheels, each with a frustum of a cone shaped to match said gear rims or rings.

In FIG. 2, and also in the remaining FIGS. 3, 4 and 5, the following reference numerals have been selected for the same parts, where the reference numeral;

1. relates to a front end of an illustrated U-formed support or housing
2. relates to a first bracket or the like, associated with a rotor unit (5),
3. relates to a gear rim or ring, associated with said rotor unit (5),
4, 4'. relates to each of two illustrated gear rotary wheels, exposing a cylindrical form,
5. relates to said rotor unit (5)
6, 6'. relates to a first bearing for one side of the arrangement, the rotor unit (5) related side, and a second bearing for the other side,
7. relates to a shaft,
8, 8'. relates to one of two axes of rotation for each of the two gear rotary wheels (4, 4'),
9, 9'. relates to coordinated gear teeth, related to the gear rotary wheels (4, 4') and cooperating with said gear rims or rings, associated with the rotor unit and the stator unit,
10. relates to a bearing for said rotor unit and its right-hand side,
11, 11'. relates to the screws, which are to retain the two parts (1, 12) of the housing, one (1) associated with the rotor (5), one associated with the stator (15),
12. relates to a planar housing part (for the rear section) associated with the stator (15),
13. relates to a bracket, associated with the stator unit (15),
14. relates to a gear rim or ring, associated with the stator unit (15),
15. relates to the stator unit and its stator coils,
16. relates to an electric coupling box,
17. relates to a device or connecting pins for discharging voltage from the stator unit functioning as a generator,
18. relates to one of a plurality of air holes,
19. relates to a commutator, and
20. relates to the arrangement or structure, according to the invention.

Further reference numerals are to be presented in the following description.

According to the present invention, a first embodiment is illustrated more closely in FIGS. 2 and 3, which shows that said speed transforming means 4, 4' thus includes, on the one hand, a gear rim or ring 14, associated with the stator 15, in any event two 4, 4', preferably three, but also four or more, gear rotary wheels 4, 4' each having a cylindrical form, coordinated with the housing or support 1, 12, and a corresponding gear rim or ring 3, associated with the rotor 5.

A set of coils 15a, associated with the stator 15, and allocated to the generator is coordinated so as to generate a tree-phase alternating current alternative a direct current with the aid of per se known rectifying means, which are, of solely simplifying reasons, not shown and thus not illustrated in detail.

The embodiment according to FIG. 2 illustrates that the rotor 5 displays a number of magnets, some given the reference numerals 5a, 5b, 5c oriented adjacent one another and designated with "+" and "−" in order thereby to indicate "north" pole and "south" pole, which during a rotation are to pass rotating coils 15a, associated with the stator unit 15 and where FIG. 2 more unambiguously discloses that said magnets 5a, 5b and 5c are selected as permanent magnets.

These permanent magnets 5a, 5b and 5c are selected from one or more permanent magnet materials exposing a very high magnetic flux capacity, which are known to the art and thus not mentioned more in detail.

Generated voltage is discharged at four connecting terminals or pins, herein referenced with numeral 17 in FIG. 2.

FIG. 4 is intended to illustrate one embodiment where said magnets are selected as DC (Direct Current) magnetised magnets, but the embodiment according to FIG. 4 substantially agrees with that illustrated in FIG. 2, but with a required voltage regulator.

The speed of the rotor unit 5 and the speed of the stator unit 15 are mutually adapted in order to be able to generate voltage pulses with a selected frequency, where this selected frequency may, depending upon practical application within the used network, be selected normally to 50 Hz or 60 Hz.

A device for discharging the voltage and the current in a generator application has been given reference numeral 17' (See FIG. 4) and discloses four voltage carrying pins, in order to make it possible to cause a switching between a "D"-coupling and a "Y"-coupling, for an adaptation to a used three-phase network.

Reference numeral 19 illustrates a commutator intended to supply current and voltage to used DC-coils within the rotor unit 5 so that these give or generate a magnetic field, which may correspond to the magnetic field of the permanent magnets in FIGS. 2 and 3.

The bracket 13 (and/or the bracket 2), adapted for the stator 15 (and/or the rotor 5), should consist of a material of low magnetic conductivity. Aluminium is here proposed as a suitable material.

More particularly, it is disclosed that a bracket 2, connected to the shaft 7, is to be adapted to support a gear rim or ring 3 or the like, associated with said rotor unit 5 and where the tooth are oriented on a diameter exceeding a selected diameter for the rotor unit 5.

A bracket 13, connected to the stator unit 15, is adapted to support a gear rim or ring 14 associated with the stator unit 15 and where the tooth are oriented on a diameter exceeding a selected diameter for the rotor unit 5 and a selected diameter for the stator unit 15 so that these two gear rims or rings 3 and 14 will be mirror-reversed and can thereby cooperate with each other over said interposed gear rotary wheels 4, 4'.

In particular, it is disclosed that, between pairwise coordinated gear rims or ring 3, 14, there are disposed in any event two gear rotary wheels 4, 4' having a cylindrical outer form, both wheels rotatably secured in a housing or support 1, 12 surrounding the rotor unit 5, the stator unit 15 and associated brackets 2, 13 or the like, where both are rotatably related to said front end section 1.

More particularly, it is disclosed that said axis of rotation 8, 8' for each one of said cylindrical formed rotary wheels 4, 4' are to be oriented at right angles to an axis 7' of rotation 7 allocated for the rotor 5.

More specifically, the described embodiment shows in FIGS. 2 and 4 the presence of two coordinating gear rotary wheels 4, 4', two ball bearings 6, 6', as well as four different air holes, all given the same reference numeral 18.

There is further shown an upper part 15" of a stator coil 15a and a lower part 15' of a stator coil 15a.

The shafts 8, 8' for the rotary wheels 4, 4' are here directed diametrically away from one another, given that they have been selected to be two or four in number.

The bearing device designated 6 has its counterpart in a bearing device 6' on the stator unit side.

FIG. 5 shows, in side elevation and in section, a third embodiment of a motor- or generator-related arrangement or structure 20 where a stator unit 15 related gear rim 14' and a rotor unit 5 related gear rim 3' are interrelated by another design related to the used gear rotary wheels 4a, 4a', each with a frustum of a cone shaped to match the design of said gear rims 3' and 14', and with the wheels converging in a direction from the axis 7'. The wheels may converge in a direction towards the axis 7'.

This construction has its benefits in that mechanical forces are distributed in a way that they act in an angular direction and the angle may be chosen to a specific value related to the application. It is of course possible to choose this angle to 45°, however this angle may be chosen between 20 and 70°.

This adoption of the angles mentioned above is caused in order to create conditions where the two gear rims 3' and 14' and the associated gear rotary wheels 4a, 4a' are adopted to "lock" the gear rims in a linear direction towards each other in order to increase stability in the transmission or rotary movement.

Figure 6:
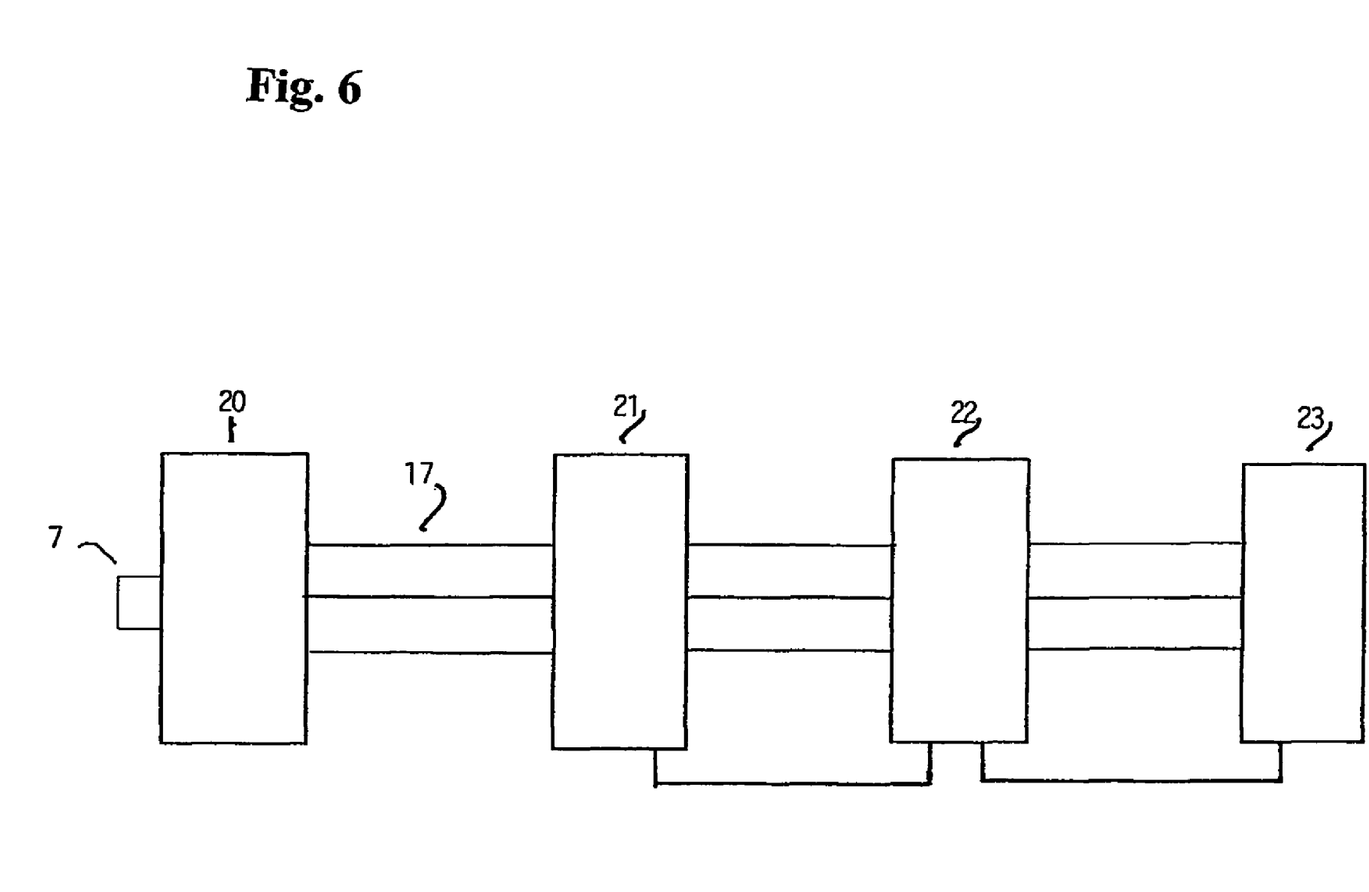
FIG. 6 shows a circuit arrangement in block form adapted to regulate the generated current and/or voltage depending upon chosen rotation values and actual load.

FIG. 6 shows a circuit arrangement adapted to regulate the generated current and/or voltage depending upon chosen rotation values and actual load.

In this respect the generator arrangement 20 generates a three-phase alternating current 17 to a pulse counting unit 21, shown in FIG. 6 in a block form, and this unit 21 is adapted to count pulses and thereby control the revolution of the generator.

The control of the output energy is caused by using a thyristor arrangement 22, which is constructed in a manner where simultaneously the control of the effect and the rectifying sequence are preformed for each phase from the generator arrangement 20. A load has been given the reference numeral 23.

With a circuit arrangement, illustrated in block form in FIG. 6, the control of the output effect is simplified.

It is to be noted that the suggested generator arrangement 20, according to the present invention, generates twice the number of electric pulses per revolution and this will generate a higher effect than a generator arrangement with a stationary stator section or part.

In an embodiment illustrating the function of the present invention it is suggested that the generator arrangement 20 is caused to expose a revolution speed of 500 RPM (Revolution Per Minute) and that the maximal output current at this speed is chosen to 90 A.

As a consequence of this a revolution up to 1000 RPM will generate 180 A, if there is a demand to generate higher effect.

The embodiment according to FIG. 6 illustrates that the number of pulses/revolutions are counted in block 21 for determination of the actual revolution and than the working point for the thyristors are calculated in dependence of the actual effect chosen.

This effect is more or less self-controlled and is depending upon two conditions, adapted to control the effect generated by the generator arrangement.

When the load is at maximum for the generator arrangement 20 (90 A) and the revolution is high (1000 RPM) the arrangement is activating 50% of the total load capacity.

The generator arrangement 20 is adapted to supply the energy required for each moment in the load.

This possibility of effect-controlling the working point, in order to adapt the continuous generation of electrical effect, adapts the demand during operation and there is no need of increasing electronic equipments in vehicles and increasing the charging capacity without running the motor in idle conditions.

It is suggested that the generator 20 is in 500 RPM adapted for max. charging effect.

An increase of the revolutions will increase the output effect, however, this rise may be regulated by extinguishing generated pulses.

The actual load at 23 will be transmitted to the control unit 22 and the control unit 22 is governed by the unit 21.

The present invention is naturally not restricted to the embodiment disclosed by way of example above but may be subject to modifications without departing from the inventive concept as disclosed in the appended claims.

In particular, it should be observed that each illustrated unit and/or circuit may be combined with each other shown unit and/or circuit without departing from the scope of invention in order to be able to attain the desired technical function.

The invention claimed is:

1. A motor or generator-related arrangement or structure with two parts rotatably disposed in relation to one another, where a first part, serving as rotor, is rotatably disposed about a shaft in a first selected direction of rotation and a second part, serving as stator, is rotatably in a second selected direction of rotation counter-directed to said first selected direction of rotation, and means adapted to transforming the speed related to said first direction of rotation to said second direction of rotation, said means being adapted, on the basis of said first selected direction of rotation and a selected speed, to transform this speed to a corresponding speed for the second direction of rotation, wherein said means comprises a gear rim or ring associated with the stator, a number of gear rotary wheels coordinated with a housing or support, and a gear rim or ring associated with the rotor wherein a bracket connected to the shaft is adapted to support a first gear rim or ring, associated with said rotor, the teeth of which are oriented on a diameter exceeding a selected diameter for said rotor.

2. An arrangement as claimed in claim 1, wherein said coils related to the associated stator are coordinated so as to generate a three-phase alternating current or a direct current (DC-current) via rectifying means.

3. An arrangement as claimed in claim 1, wherein said rotor is adapted to display a number of magnets which are disposed, during a rotation, to pass rotating coils associated with the stator.

4. An arrangement as claimed in claim 3, characterized in that said magnets ($5a$, $5b$, $5c$) are selected as permanent magnets.

5. An arrangement as claimed in claim 3, wherein said magnets are selected as DC-current magnetized magnets.

6. An arrangement as claimed in claim 3, wherein the speed of the rotor and the speed of the stator are mutually adapted so as to be able to generate voltage pulses of a selected frequency.

7. An arrangement as claimed in claim 1, wherein a bracket intended for the stator and a bracket intended for the rotor consist of a material of low magnetic conductivity.

8. An arrangement as claimed in claim 1, wherein a bracket connected to the stator is adapted to support a gear rim or ring, associated with the stator, the teeth of which are oriented on a diameter exceeding a selected diameter for said rotor and a selected diameter for the stator.

9. An arrangement as claimed in claim 8, wherein between pairwise coordinated gear rims or rings there are disposed at least two gear rotary wheels, rotatably secured to a housing surrounding the rotor, the stator and associated brackets.

10. An arrangement as claimed in claim 1, wherein between pairwise coordinated gear rims or rings there are disposed at least two gear rotary wheels, rotatably secured to a housing surrounding the rotor, the stator and associated brackets.

11. An arrangement as claimed in claim 10, wherein the axis of rotation, for each one of said gear rotary wheels, are oriented at right angles to the axis of rotation allocated to the rotor.

12. An arrangement as claimed in claim 1, characterized in that each of said gear rotary wheels are formed as frustum of a cone, with outer gear teeth adapted to cooperate with adjacent two gear rims or rings ($3'$, $14'$) having correspondingly arranged gear teeth.

13. An arrangement as claimed in claim 12, characterized in that said cone is formed with an angle of between 20 and 70 degrees especially about 45 degree.

14. An arrangement as claimed in claim 1, wherein at a generator adapted application said generator is caused to generate full effect during idle running and at an increased rotation a reduced effect is caused by extinguish one or more generated pulses.

15. An arrangement as claimed in claim 1, wherein a bracket connected to the stator is adapted to support a gear rim or ring, associated with the stator, the teeth of which are oriented on a diameter exceeding a selected diameter for said rotor and a selected diameter for the stator.

16. An arrangement as claimed in claim 15, wherein between pairwise coordinated gear rims or rings there are disposed at least two gear rotary wheels, rotatably secured to a housing surrounding the rotor, the stator and associated brackets.

17. A motor or generator-related arrangement or structure with two parts rotatably disposed in relation to one another, where a first part, serving as rotor, is rotatably disposed about a shaft in a first selected direction of rotation and a second part, serving as stator, is rotatably in a second selected direction of rotation counter-directed to said first selected direction of rotation, and means adapted to transforming the speed related to said first direction of rotation to said second direction of rotation, said means being adapted, on the basis of said first selected direction of rotation and a selected speed, to transform this speed to a corresponding speed for the second direction of rotation, wherein said means comprises a first gear rim or ring associated with the stator wherein teeth of said first gear ring or ring are disposed on an axially facing surface thereof, and a second gear rim or ring associated with the rotor wherein teeth of said second gear rim or ring are disposed on an axially facing surface thereof facing said teeth of said first gear ring or rim, and a number of gear rotary wheels coordinated with a housing or support and engaged between said first and second gear rims or rings; and the teeth of which are oriented on a diameter exceeding a selected diameter for said rotor, said gear rotary wheels engaged between said first and second gear rim or ring.

18. A motor or generator-related arrangement or structure according to claim 17, wherein toothed surfaces of said first and second gear ring or rim face each other in a mirror reversed configuration.

19. A motor or generator-related arrangement or structure according to claim 17, wherein said first and second gear rings or rims are of equal diameter.

* * * * *